(12) United States Patent
Foege et al.

(10) Patent No.: US 8,960,100 B2
(45) Date of Patent: *Feb. 24, 2015

(54) ENERGY RECOVERY SYSTEM FOR A MOBILE MACHINE

(75) Inventors: Aaron Gamache Foege, Westmont, IL (US); Joshua Wayne Steffen, Mountain View, CA (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/562,808

(22) Filed: Jul. 31, 2012

(65) Prior Publication Data

US 2014/0033941 A1 Feb. 6, 2014

(51) Int. Cl.
*B61C 11/00* (2006.01)
*B61C 17/00* (2006.01)

(52) U.S. Cl.
USPC .................................. 105/26.05; 105/231

(58) Field of Classification Search
USPC ............... 105/1.4, 26.05, 62.1, 231, 236
See application file for complete search history.

(56) References Cited

U.S. PATENT DOCUMENTS

| | | | |
|---|---|---|---|
| 308,948 A | 12/1884 | Bruce | |
| 331,716 A | 12/1885 | Katz | |
| 338,028 A | 3/1886 | Bower | |
| 3,352,294 A | 7/1965 | Biller et al. | |
| 3,406,526 A | 10/1968 | Lusk | |
| 3,473,341 A | 10/1969 | Mulder | |
| 4,137,006 A | 1/1979 | Becker | |
| 4,359,118 A | 11/1982 | Latter et al. | |
| 4,551,065 A | 11/1985 | Becker | |
| 4,630,572 A | 12/1986 | Evans | |
| 4,646,701 A | 3/1987 | Fukumoto | |
| 5,129,328 A | 7/1992 | Donnelly | |
| 5,269,225 A | 12/1993 | Bosshart et al. | |
| 5,375,580 A * | 12/1994 | Stolz et al. | 123/527 |
| 5,461,873 A | 10/1995 | Longsworth | |
| 5,513,498 A | 5/1996 | Ackermann et al. | |
| 5,544,483 A | 8/1996 | Heuer | |
| 5,567,105 A | 10/1996 | Williams | |
| 5,609,141 A | 3/1997 | Matsuoka et al. | |
| 5,692,458 A | 12/1997 | Green | |
| 5,887,567 A * | 3/1999 | White et al. | 123/294 |
| 6,408,766 B1 | 6/2002 | McLaughlin et al. | |
| 6,460,517 B1 | 10/2002 | Dauer | |
| 6,506,018 B1 | 1/2003 | Brennan | |
| 6,615,118 B2 | 9/2003 | Kumar | |

(Continued)

FOREIGN PATENT DOCUMENTS

| | | |
|---|---|---|
| CH | 1 261 237 | 3/1969 |
| DE | 102009042256 | 4/2011 |

(Continued)

*Primary Examiner* — R. J. McCarry, Jr.
(74) *Attorney, Agent, or Firm* — Finnegan, Henderson, L.L.P.

(57) ABSTRACT

The disclosure is directed to an energy recovery system for a mobile machine. The mobile machine may include a locomotive and a tender car. The recovery system may include a tank located on the tender car. The tank may be configured to store a liquid fuel for combustion within a main engine located on the locomotive. The recovery system may also include a fuel delivery circuit connecting the tank to the main engine, and an auxiliary engine located on the locomotive. The auxiliary engine may be selectively connectable to receive gaseous fuel formed in the tank. The energy recovery system may also include a boil-off circuit connecting the tank to the auxiliary engine.

20 Claims, 3 Drawing Sheets

(56) References Cited

U.S. PATENT DOCUMENTS

| | | |
|---|---|---|
| 6,698,211 B2 | 3/2004 | Gustafson |
| 6,701,721 B1 | 3/2004 | Berchowitz |
| 6,725,134 B2 | 4/2004 | Dillen et al. |
| 6,807,812 B2 | 10/2004 | Lehmann et al. |
| 6,898,940 B2 | 5/2005 | Gram et al. |
| 6,907,735 B2 | 6/2005 | Wolff et al. |
| RE39,599 E | 5/2007 | Kanamaru |
| 7,231,877 B2 | 6/2007 | Kumar |
| 7,304,445 B2 | 12/2007 | Donnelly |
| 7,308,889 B2 | 12/2007 | Post et al. |
| 7,373,931 B2 | 5/2008 | Lennox et al. |
| 7,412,835 B2 | 8/2008 | Legall et al. |
| 7,430,967 B2 | 10/2008 | Kumar |
| 7,434,407 B2 | 10/2008 | Haberbusch et al. |
| 7,448,328 B2 | 11/2008 | Kumar |
| 7,631,635 B2 | 12/2009 | Hochstein et al. |
| 7,689,341 B2 | 3/2010 | Miller |
| 7,765,859 B2 | 8/2010 | Connell et al. |
| 8,015,808 B2 | 9/2011 | Keefer et al. |
| 8,056,540 B2 | 11/2011 | Debastos et al. |
| 8,079,437 B2 | 12/2011 | Rosman |
| 8,095,253 B2 | 1/2012 | Kane et al. |
| 8,112,191 B2 | 2/2012 | Kumar et al. |
| 8,196,518 B2 | 6/2012 | Bachman |
| 2004/0149254 A1 | 8/2004 | Piock |
| 2005/0279242 A1 | 12/2005 | Maier et al. |
| 2006/0005736 A1 | 1/2006 | Kumar |
| 2008/0000381 A1 | 1/2008 | Bartley et al. |
| 2008/0053349 A1 | 3/2008 | O'Connor et al. |
| 2008/0083576 A1 | 4/2008 | Read |
| 2008/0121136 A1 | 5/2008 | Mari et al. |
| 2008/0302093 A1 | 12/2008 | Montgomery et al. |
| 2009/0187291 A1 | 7/2009 | Daum et al. |
| 2009/0234521 A1 | 9/2009 | Kumar et al. |
| 2010/0019103 A1 | 1/2010 | Kane et al. |
| 2010/0070117 A1 | 3/2010 | Siffert |
| 2010/0114404 A1 | 5/2010 | Donnelly |
| 2010/0175579 A1 | 7/2010 | Read |
| 2010/0175666 A1 | 7/2010 | Nishio et al. |
| 2010/0186619 A1 | 7/2010 | Kumar |
| 2011/0061364 A1 | 3/2011 | Raman |
| 2011/0067390 A1 | 3/2011 | Cook |
| 2011/0162903 A1 | 7/2011 | Stragier |
| 2011/0203480 A1 | 8/2011 | Donnelly |
| 2011/0217610 A1 | 9/2011 | Guo et al. |
| 2011/0257869 A1 | 10/2011 | Kumar et al. |
| 2012/0085260 A1* | 4/2012 | Nichini et al. ............ 105/35 |
| 2014/0033943 A1 | 1/2014 | Foege et al. |
| 2014/0033942 A1 | 2/2014 | Foege |
| 2014/0033944 A1 | 2/2014 | Foege |
| 2014/0033948 A1 | 2/2014 | Foege |
| 2014/0034151 A1 | 2/2014 | Foege |
| 2014/0165568 A1 | 6/2014 | Foege |

FOREIGN PATENT DOCUMENTS

| | | |
|---|---|---|
| EP | 0 069 717 | 12/1983 |
| EP | 2 154 044 A2 | 2/2010 |
| EP | 2 154 044 B1 | 1/2012 |
| JP | 56 118533 | 9/1981 |
| JP | 60-219780 | 11/1985 |
| JP | 5-248599 | 9/1993 |
| JP | 6 033 784 | 2/1994 |
| JP | 6-307728 | 11/1994 |
| JP | 2000 136756 | 5/2000 |
| JP | 2007 113442 | 5/2007 |
| JP | 2008 201890 | 9/2008 |
| JP | 2010 023776 | 2/2010 |
| RU | 2009142173 | 5/2011 |
| WO | WO-2007/067093 A1 | 6/2007 |
| WO | WO 2008/025158 | 3/2008 |
| WO | WO 2008/037571 | 4/2008 |
| WO | WO 2009/021262 | 2/2009 |
| WO | WO 2010/012252 | 2/2010 |

* cited by examiner

ENERGY RECOVERY SYSTEM FOR A MOBILE MACHINE

TECHNICAL FIELD

The present disclosure relates generally to a recovery system, and more particularly, to an energy recovery system for a mobile machine.

BACKGROUND

Natural gas has been used as an alternative fuel for internal combustion engines in mobile machines. Because natural gas has a lower volumetric energy density than traditional fuels, such as diesel and gasoline, mobile machines generally utilize liquefied natural gas ("LNG"). At atmospheric pressures, natural gas must be chilled to below about −160° C. to remain in liquid form. Mobile machines utilizing LNG as a fuel, store the LNG in insulated tanks. Because these tanks are not perfect insulators, heat enters the tanks, causing some of the LNG to boil ("boil-off"). The boil-off increases the pressure of the tanks, and can cause excessive stress to the tanks if not removed. Traditional LNG systems vent the boil-off (composed mostly of methane) directly to the atmosphere. However, because methane is a greenhouse gas, government regulations are soon expected to prohibit the direct venting of boil-off to the atmosphere.

One method of handling boil-off from an LNG tank is described in U.S. Patent Publication No. 2008/0053349 ("the '349 publication") of O'Connor that published on Mar. 6, 2008. The '349 publication describes a marine vessel having a tank for storing LNG. The '349 publication delivers boil-off gas from the tank to a combustion section via a gas inlet. Combustion air is also directed to the combustion section and the resulting air-gas mixture is ignited. This system effectively converts the boil-off to carbon dioxide and water, which are less harmful to the environment.

Although the system of the '349 publication may be capable of preventing boil-off from directly venting to the atmosphere, it may be wasteful. Specifically, because the system of the '349 publication only combusts the boil-off, energy associated with the boil-off is lost from the system as heat and exhaust.

The energy recovery system of the present disclosure solve one or more of the problems set forth above and/or other problems with existing technologies.

SUMMARY

In one aspect, the disclosure is directed to an energy recovery system for a mobile machine having a locomotive and a tender car. The energy recovery system may include a tank located on the tender car. The tank may be configured to store a liquid fuel for combustion within a main engine located on the locomotive. The energy recovery system may also include a fuel delivery circuit connecting the tank to the main engine, and an auxiliary engine located on the locomotive. The auxiliary engine may be selectively connectable to receive gaseous fuel formed in the tank. The energy recovery system may also include a boil-off circuit connecting the tank to the auxiliary engine.

In another aspect, the disclosure is directed to a method of operating a mobile machine having a locomotive and a tender car. The method may include directing liquid fuel from a tank located on the tender car through a fuel delivery circuit toward a main engine located on the locomotive. The method may also include directing gaseous fuel formed in the tank through a boil-off circuit toward an auxiliary engine located on the locomotive.

DETAILED DESCRIPTION

Figure 1:
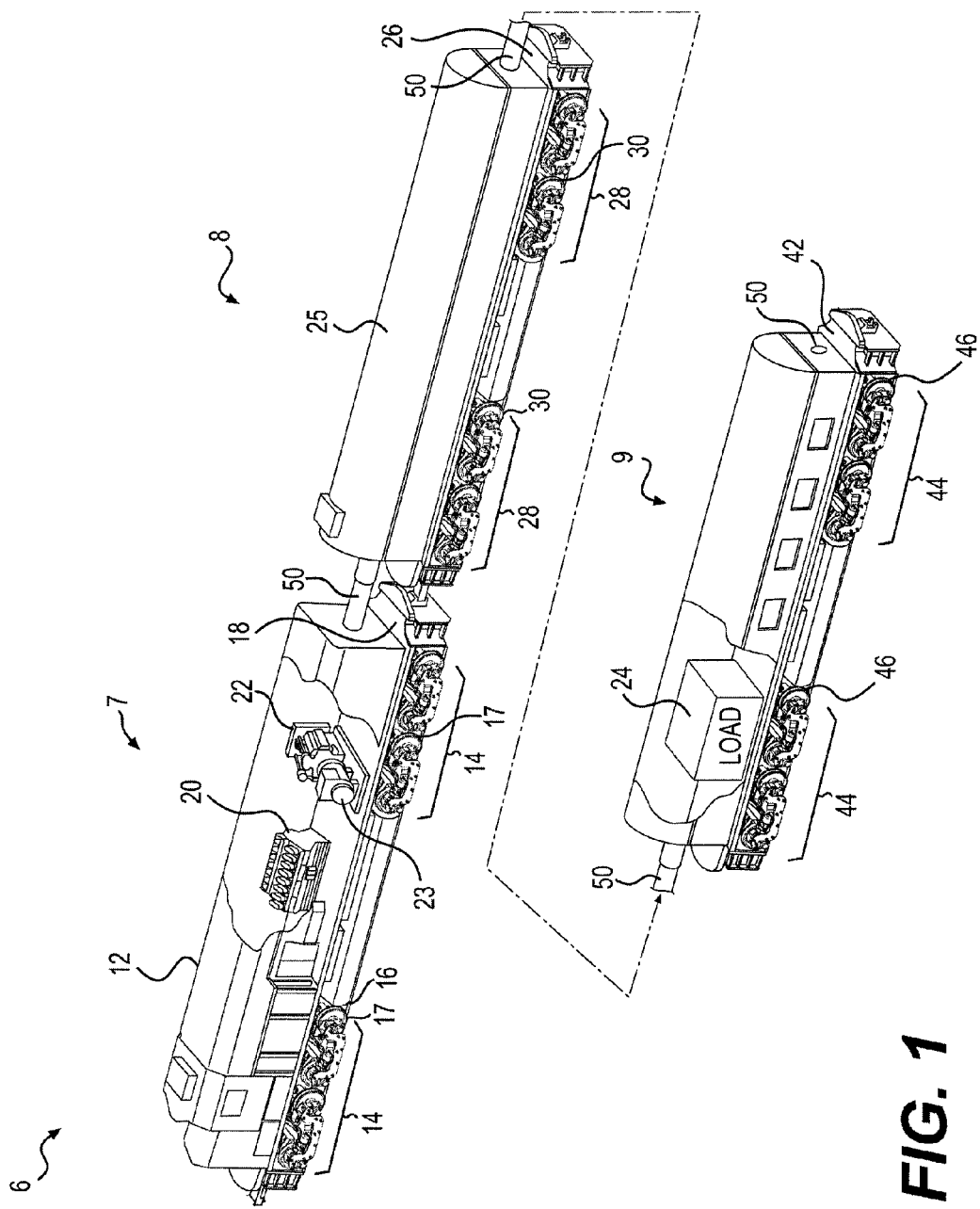
FIG. 1 is a pictorial illustration of an exemplary disclosed mobile machine.

FIG. 1 illustrates an exemplary embodiment of a mobile machine 6, such as a train consist having a locomotive 7, and a tender car 8. In some embodiments, mobile machine 6 may also include additional cars 9 towed by locomotive 7 and tender car 8, for example, a passenger car, a cargo container car (not shown), or another type of car. Locomotive 7 may include a body 12 supported at opposing ends by a plurality of trucks 14 (e.g., two trucks 14). Each truck 14 may be configured to engage a track 16 via a plurality of wheels 17, and support a frame 18 of body 12. Any number of engines may be mounted to frame 18 and configured to produce electricity that drives wheels 17 included within each truck 14. In the exemplary embodiment shown in FIG. 1, locomotive 7 includes a main engine 20 and an auxiliary engine 22.

Main engine 20 may be a large engine having sixteen cylinders and a rated power output of around 4,000 brake horsepower (bhp). It should be noted, however, that engines with other suitable number of cylinders or rated power outputs may alternatively be utilized. Main engine 20 may drive a traction generator (not shown) capable of outputting AC and/or DC electrical power. Main engine 20 may be responsible for generating the propulsive force of mobile machine 6 via traction motors (not shown). Main engine 20 may be an LNG engine, a diesel engine, a gasoline engine, or another type of fuel-powered engine.

Auxiliary engine 22 may have a smaller output than main engine 20, and be coupled to mechanically rotate a generator 23 to provide electrical power to an external load 24. For example, auxiliary engine 22 may have fewer cylinders (e.g., six to twelve) and have a lower rated power output (e.g., 400-1400 bhp). It should be noted, however, that engines with other suitable number of cylinders or rated power outputs may alternatively be utilized. Similar to main engine 20, auxiliary engine 22 may be an LNG engine, a diesel engine, a gasoline engine, or another type of fuel-powered engine. External load 24 may include, for example, lights, motors, heating elements, electronic circuitry, refrigeration devices, air conditioning units, etc.

Generator 23 may be, for example, an AC induction generator, a permanent-magnet generator, an AC synchronous generator, or a switched-reluctance generator that is mechanically driven by auxiliary engine 22 to produce electrical power. In one embodiment, generator 23 may include multiple pairings of poles (not shown), each pairing having three phases arranged on a circumference of a stator (not shown) to produce an alternating current. Electrical power produced by generator 23 may be directed for offboard purposes to external load 24.

Tender car 8 may include a tank 25 configured to store a liquid fuel (e.g., LNG) for combustion within main engine 20. Tank 25 may be an insulated, single or multi-walled tank configured to store the liquid fuel at low temperatures, such as below about −160° C. Tank 25 may be mounted to a frame 26 configured to be pulled by locomotive 7. Frame 26 may be supported by a plurality of trucks 28 (e.g., two trucks 28). Similar to truck 14, each truck 28 may be configured to engage track 16 via a plurality of wheels 30.

Car 9 may be mounted to a frame 42 configured to be pulled by locomotive 7. Frame 42 may be supported by a plurality of trucks 44 (e.g., two trucks 44). Similar to truck 14, each truck 44 may be configured to engage track 16 via a plurality of wheels 46. Car 9 may include an external load 24 having any type of power consuming system or device that receives electrical power supplied by generator 23 and utilizes the electrical power to perform some type of task.

One or more connections 50 may be disposed between locomotive 7 and tender car 8, and between tender car 8 and car 9. Connections 50 may include any type of electrical connector or system that is capable of coupling together generator 23 and one or more external loads 24. For example, each connection 50 may include various switching devices, junction boxes, circuit interrupting devices, fuses, or any other components that may be suitable for electrically interconnecting generator 23 and external load 24. Connection 50 may also or alternatively include a voltage transformer and/or power synchronizer configured to reduce or otherwise condition the power provided by generator 23 to a suitable level for use by conventional consumer devices.

In the embodiment of FIG. 1, tender car 8 and car 9 have two connections 50 at a front end and at a rear end (referring to the direction of travel). In this manner, multiple tender cars 8 and cars 9 can be serially connected, and auxiliary engine 22 may provide electrical power to additional external loads 24 located on subsequent cars 9. It should be noted that locomotive 7 and/or tender car 8 may also include an external load (not shown) configured to draw electrical power from auxiliary engine 22, for example a pump, valving, etc., utilized to move and/or process fuel.

Figure 2:
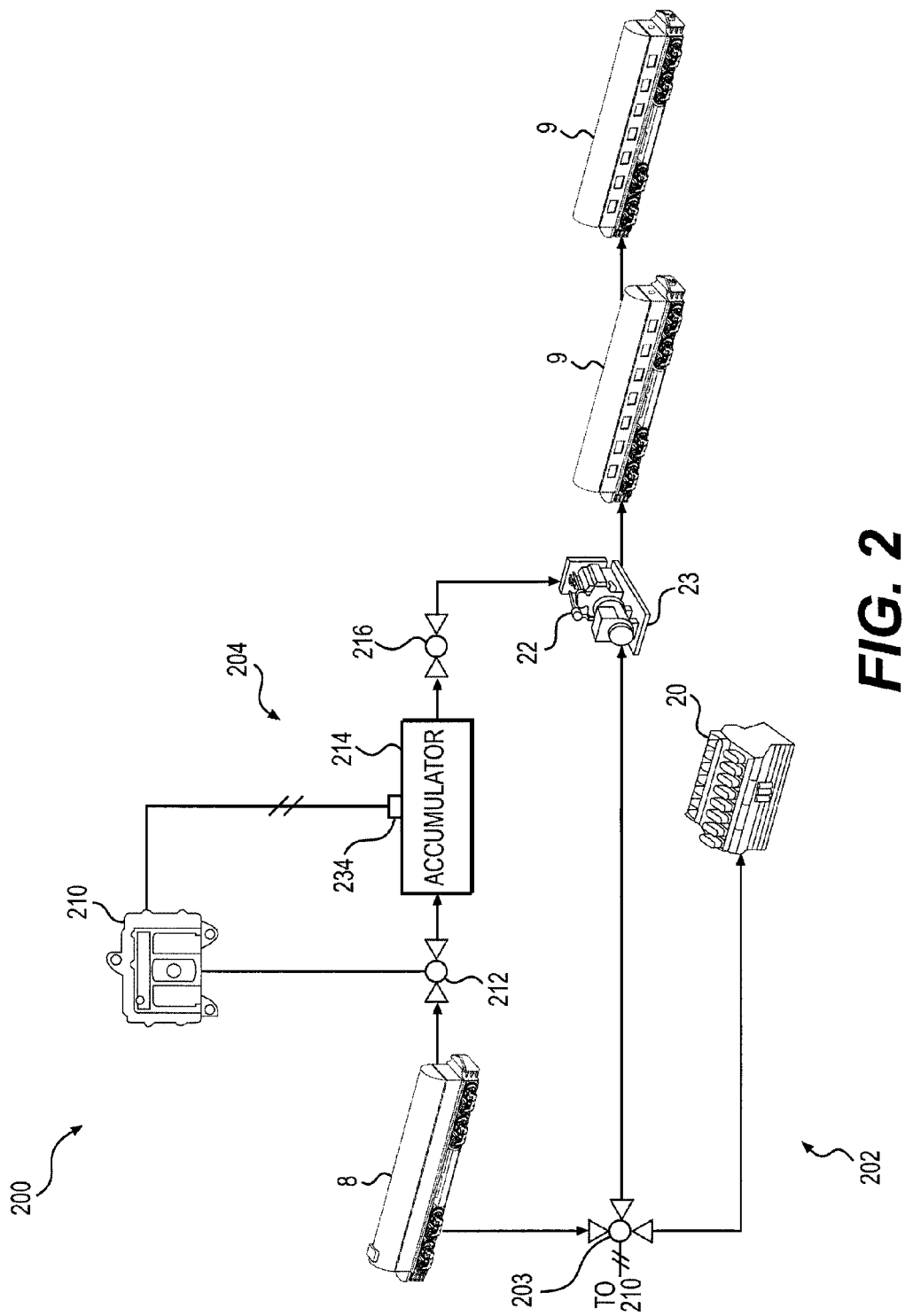
FIG. 2 is a diagrammatic illustration of an exemplary disclosed energy recovery system that may be used in conjunction with the mobile machine of FIG. 1.

As shown in FIG. 2, mobile machine 6 may be equipped with an energy recovery system ("system") 200 that is configured to generate work by combusting boil-off gas formed in tank 25. System 200 may include, among other things, a fuel delivery circuit 202 and a boil-off circuit 204. Fuel flow may be regulated through fuel delivery circuit 202 and boil-off circuit 204 by a controller 210.

Fuel delivery circuit 202 may include components that cooperate to deliver liquid fuel stored in tank 25 toward main engine 20 and auxiliary engine 22. Fuel delivery circuit 202 may include, among other things, conventional pumps, conduits, heat exchangers, accumulators, and injectors (not shown) configured to condition and deliver low-temperature liquid fuel from tank 25 toward main engine 20 in gaseous form, as is known in the art. Fuel delivery circuit 202 may also include a control valve 203 that helps to regulate flow between tank 25 and engines 20 and 22.

Control valve 203 may be a proportional type valve having a valve element movable to regulate a flow of fuel. The valve element may be solenoid-operable to move between a flow-passing position and a flow-blocking position. In the flow-passing position, control valve 203 may permit a maximum rate of the fuel from delivery circuit 202 to flow toward main engine 20. In the flow-blocking position, control valve 203 may completely block fuel from flowing to main engine 20 by diverting substantially all the fuel from fuel delivery circuit 202 toward auxiliary engine 22. Control valve 203 may also include an intermediate position between the flow-passing position and the flow-blocking position. In the intermediate position, control valve 203 may permit a particular amount of the fuel to flow toward main engine 20, while diverting a remaining portion of the fuel toward auxiliary engine 22. Control valve 203 may also include an off position that blocks the flow of fuel to both main engine 20 and auxiliary engine 22.

During fuel conditioning and delivery, some fuel within tank 25 may evaporate into a gaseous fuel. Boil-off circuit 204 may include components that cooperate to process the gaseous fuel formed within tank 25. In particular, boil-off circuit 204 may include an inlet control valve 212, an accumulator 214, and an outlet control valve 216. Gaseous fuel may flow from tank 25 through inlet control valve 212 to accumulator 214. From accumulator 214, gaseous fuel may flow through outlet control valve 216 to auxiliary engine 22, where it may be mixed with inlet air and combusted.

Inlet control valve 212 may be a controllable pressure-relief valve configured to selectively allow fluid communication between tank 25 and accumulator 214. When inlet control valve 212 opens, it may allow gaseous fuel to escape tank 25 and enter accumulator 214. Inlet control valve 212 may include a spring-loaded mechanism (not shown) that opens at a predetermined pressure to avoid over-pressurization of tank 25. Additionally or alternatively, inlet control valve 212 may include one or more controllable actuators, such as one or more electric solenoids that are operable to open inlet control valve 212 based on a sensed pressure or other trigger parameter. Controller 210 may be operatively connected to the actuator(s) of inlet control valve 212, so that controller 210 may selectively trigger opening and closing of inlet control valve 212 to release gaseous fuel and pressure from tank 25.

Accumulator 214 may embody, for example, a compressed gas or another suitable accumulator. Accumulator 214 may be configured to accumulate pressurized gaseous fuel and discharge the fuel to auxiliary engine 22 via outlet control valve 216.

Outlet control valve 216 may be substantially similar to inlet control valve 212, but may be configured to selectively allow fluid communication between accumulator 214 and auxiliary engine 22. When outlet control valve 216 opens, it may allow gaseous fuel to escape accumulator 214 and flow to auxiliary engine 22. Outlet control valve 216 may include a spring-loaded mechanism (not shown) that opens at a predetermined pressure to avoid over-pressurization of accumulator 214. Additionally or alternatively, outlet control valve 216 may include one or more controllable actuators, such as one or more electric solenoids that are operable to open outlet control valve 216 when actuated. Controller 210 may be operatively connected to the actuator(s) of outlet control valve 216, so that controller 210 may selectively trigger opening and closing of outlet control valve 216 to release gaseous fuel and pressure from accumulator 214.

Controller 210 may be a single microprocessor or multiple microprocessors that include a mechanism for controlling an operation of recovery system 200. Numerous commercially available microprocessors can be configured to perform the functions of controller 210. It should be appreciated that controller 210 could readily be embodied in a general engine or machine microprocessor capable of controlling numerous engine and/or machine functions. Controller 210 may include a memory, a secondary storage device, a processor, and any other components for running an application. Various other circuits may be associated with controller 210 such as power supply circuitry, signal conditioning circuitry, solenoid driver circuitry, and other types of circuitry.

Controller 210 may rely on input from one or more sensors during regulation of energy recovery system 200. In the disclosed exemplary embodiment, controller 210 may rely on at least one sensor 234 configured to measure a pressure of accumulator 214. Sensor 234 may direct corresponding signals to controller 210 for further processing.

Figure 3:
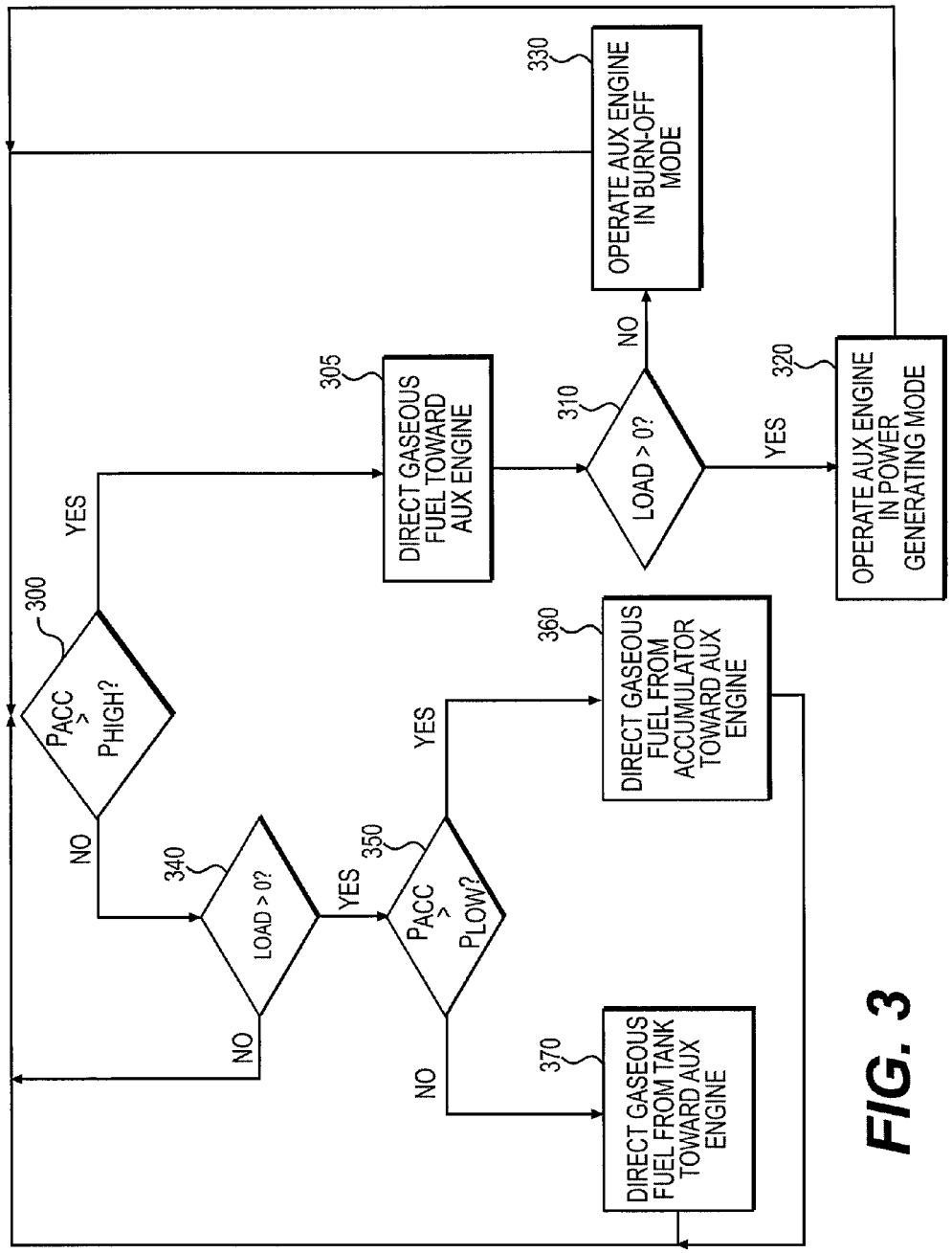
FIG. 3 is a flowchart depicting an exemplary disclosed method of controlling the energy recovery system of FIG. 2.

FIG. 3 illustrates an exemplary energy recovery process performed by controller 210. FIG. 3 will be discussed in more detail in the following section to better illustrate the disclosed concepts.

INDUSTRIAL APPLICABILITY

The disclosed energy recovery system may be applicable to any mobile machine utilizing a low-temperature liquid fuel. The disclosed energy recovery system may enhance fuel efficiency by using otherwise wasted gaseous fuel formed in a liquid fuel tank to generate useful electricity. Operation of recovery system 200 will now be described.

If, at any time during the operation of consist 6, the pressure of accumulator 214 is higher than a high-pressure threshold (step 300: Yes), controller 210 may move outlet control valve 216 to the flow-passing position to direct gaseous fuel from accumulator 214 to auxiliary engine 22 regardless of a demand for electrical power from external load 24 (step 305). The high-pressure threshold may be associated with a capacity of accumulator 214 to store additional gaseous fuel. If not yet operational, controller 210 may initiate operation of auxiliary engine 22 at this time. From step 305, controller 210 may proceed to step 310.

At step 310, controller 210 may determine if there is a demand for electricity from external load 24. This demand may be determined based on operator commands (e.g., via an operator input device (not shown) for controlling external load 24) indicating that external load 24 has an electrical demand. It should be noted that any other suitable mechanism for determining an electrical demand of external load 24 may alternatively be utilized. If external load 24 has an electrical demand at step 310, controller 210 may proceed to step 320.

At step 320, controller 210 may operate auxiliary engine 22 in a power generating mode to produce electrical power via generator 23 and distribute the generated electricity to external load 24. From step 320, controller 210 may return to step 300. If at step 310, controller 210 instead determines that external load 24 has an electrical demand of about zero, controller 210 may proceed to step 330.

At step 330, controller 210 may operate auxiliary engine 22 in a burn-off mode. In the burn-off mode, excess gaseous fuel may be burned away to relieve pressures in tank 25 and/or accumulator 214 without generating significant amounts of electricity. In one embodiment, controller 210 may operate auxiliary engine 22 in an idle state during the burn-off mode. Alternatively, controller 210 may operate auxiliary engine 22 to generate electricity in the burn off-mode, which may then be stored or dissipated in a resistive grid, if desired.

If at step 300, controller 210 instead determines that the pressure of accumulator 214 is lower than the high-pressure threshold, controller 210 may proceed to step 340. At step 340, controller 210 may determine if there is a demand for electricity from external load 24 in a similar manner as performed at step 310. If at step 340, controller 210 determines that external load 24 has an electrical demand of about zero, controller 210 may return to step 300. If at step 340, controller 210 instead determines that external load 24 has an electrical demand, controller 210 may proceed to step 350.

At step 350, controller 210 may receive input from sensor 234 indicative of the pressure of accumulator 214. Controller 210 may then determine if the pressure of accumulator 214 is higher than a low-pressure threshold. The low-pressure threshold may be associated with an amount of gaseous fuel stored in accumulator 214 sufficient to operate auxiliary engine 22. When the accumulator pressure is higher than the low-pressure threshold, controller 210 may move outlet control valve 216 to the flow-passing position and direct gaseous fuel from accumulator 214 to auxiliary engine 22 (step 360), where auxiliary engine 22 may be operated in the power generating mode. If not yet operational, controller 210 may initiate operation of auxiliary engine 22 at this time. From step 360, controller 210 may return to step 300.

If at step 350, controller 210 instead determines that the accumulator pressure is lower than the low-pressure threshold, controller 210 may proceed to step 370. At step 370, controller 210 may move control valve 203 to the flow-passing position or to the intermediate position, and direct liquid fuel from tank 25 through fuel delivery circuit 202 toward auxiliary engine 22, where auxiliary engine 22 may be operated in the power generating mode. If not yet operational, controller 210 may initiate operation of auxiliary engine 22 at this time. From step 370, controller 210 may return to step 300. It should be noted that liquid fuel may gasify through fuel delivery circuit 202 before being delivered to auxiliary engine 22.

The disclosed energy recovery system 200 may provide a mechanism for improving fuel efficiency of mobile machine 10. In particular, the disclosed energy recovery system 200 may divert boil-off gas to be used as fuel by auxiliary engine 22 that generates useful electricity. Energy recovery system 200 may thus utilize energy from boil-off gas that otherwise would be lost, while also reducing liquid fuel normally consumed by auxiliary engine 22 to produce electricity.

It will be apparent to those skilled in the art that various modifications and variations can be made to the disclosed energy recovery system without departing from the scope of the disclosure. Other embodiments of the energy recovery system will be apparent to those skilled in the art from consideration of the specification and practice of the energy recovery system disclosed herein. It is intended that the specification and examples be considered as exemplary only, with a true scope of the disclosure being indicated by the following claims and their equivalents.

What is claimed is:

1. An energy recovery system for a mobile machine having a locomotive and a tender car, comprising:
 a tank located on the tender car and being configured to store a liquid fuel for combustion within a main engine located on the locomotive;
 a fuel delivery circuit connecting the tank to the main engine;
 an auxiliary engine located on the locomotive; and
 a boil-off circuit connecting the tank to the auxiliary engine.

2. The energy recovery system of claim 1, further including an accumulator fluidly connected to the boil-off circuit between the tank and the auxiliary engine and configured to store gaseous fuel formed in the tank.

3. The energy recovery system of claim 2, further including an inlet valve configured to selectively pass gaseous fuel from the tank to the accumulator when a pressure of the tank exceeds a tank pressure threshold.

4. The energy recovery system of claim 3, further including an outlet valve configured to selectively pass gaseous fuel from the accumulator toward the auxiliary engine when a pressure of the accumulator exceeds a high pressure threshold.

5. The energy recovery system of claim 4, further including:

a sensor configured to generate a signal indicative of the pressure of the accumulator; and a controller configured to activate the outlet valve based on the signal.

6. The energy recovery system of claim 5, further including a control valve selectively movable by the controller to direct fuel from the tank toward only the main engine, toward only the auxiliary engine, or toward both the main engine and the auxiliary engine.

7. The energy recovery system of claim 6, wherein the controller is further configured to move the control valve to direct fuel from the tank toward the auxiliary engine when the pressure of the accumulator is below a low pressure threshold.

8. The energy recovery system of claim 5, wherein the outlet valve is movable by the controller to selectively pass gaseous fuel from the accumulator to the auxiliary engine when the pressure of the accumulator exceeds a low pressure threshold.

9. The energy recovery system of claim 5, wherein the controller is configured to operate the auxiliary engine in a power generating mode when the pressure of the accumulator exceeds the high pressure threshold and an external load connected to the auxiliary engine has an electrical demand.

10. The energy recovery system of claim 5, wherein the controller is configured to operate the auxiliary engine in a burn-off mode when the pressure of the accumulator exceeds the high pressure threshold and an external load connected to the auxiliary engine has an electrical demand of about zero.

11. The energy recovery system of claim 5, wherein the controller is configured to operate the auxiliary engine in an idle state during the burn-off mode.

12. The energy recovery system of claim 5, further including:

a generator driven by the auxiliary engine; and an electrical connection in communication with the generator, the electrical connection configured to transfer electricity generated by the generator to an external load.

13. A method of operating a mobile machine having a locomotive and a tender car, the method comprising:

directing liquid fuel from a tank located on the tender car through a fuel delivery circuit toward a main engine located on the locomotive; and directing gaseous fuel formed in the tank through a boil-off circuit toward an auxiliary engine located on the locomotive.

14. The method of claim 13, further including:

accumulating gaseous fuel formed in the tank; and directing accumulated gaseous fuel toward the auxiliary engine.

15. The method of claim 14, further including operating the auxiliary engine in a power generating mode when a pressure of the accumulated gaseous fuel exceeds a high pressure threshold and an external load connected to the auxiliary engine has an electrical demand.

16. The method of claim 14, further including operating the auxiliary engine in a burn-off mode when the pressure of the accumulated gaseous fuel exceeds a high pressure threshold and an external load connected to the auxiliary engine has an electrical demand of about zero.

17. The method of claim 16, further including operating the auxiliary engine in an idle state during the burn-off mode.

18. The method of claim 14, further including directing liquid fuel from the tank toward the auxiliary engine when a pressure of the accumulated gaseous fuel is below a low pressure threshold.

19. The method of claim 14, further including directing accumulated gaseous fuel toward the auxiliary engine when a pressure of the accumulated gaseous fuel exceeds a low pressure threshold.

20. A train consist, comprising:

a locomotive having:
   a frame;
   a main engine mounted to the frame;
   a plurality of wheels configured to support the frame and driven by the main engine;
   an auxiliary engine mounted to the frame; and
   a generator driven by the auxiliary engine;

a tender car having a tank configured to store a liquid fuel;

a boil-off circuit connecting the tank to the auxiliary engine a fuel delivery circuit connecting the tank to the main engine;

an accumulator fluidly connected to the boil-off circuit between the tank and the auxiliary engine and configured to store gaseous fuel formed in the tank;

an electrical connection in communication with the generator, the electrical connection configured to transfer electricity generated by the generator to an external load;

an inlet valve configured to selectively pass gaseous fuel from the tank to the accumulator when a pressure of the tank exceeds a tank pressure threshold; and an outlet valve configured to selectively pass gaseous fuel from the accumulator toward the auxiliary engine when a pressure of the accumulator exceeds a high pressure threshold.

* * * * *